United States Patent
Hasegawa

(10) Patent No.: US 7,224,152 B2
(45) Date of Patent: May 29, 2007

(54) DC-DC CONVERTER AND CONTROL CIRCUIT FOR DC-DC CONVERTER

(75) Inventor: Morihito Hasegawa, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 21 days.

(21) Appl. No.: 11/121,067

(22) Filed: May 4, 2005

(65) Prior Publication Data
US 2006/0170405 A1     Aug. 3, 2006

(30) Foreign Application Priority Data
Jan. 31, 2005    (JP)   ........................... 2005-024325

(51) Int. Cl.
*G05F 1/40*      (2006.01)
(52) U.S. Cl. ........................ 323/282; 363/71
(58) Field of Classification Search ........ 323/267–268, 323/271–273, 282, 285, 224; 363/71, 127; 315/291, 119, 82–90, 225
See application file for complete search history.

(56) References Cited

U.S. PATENT DOCUMENTS 6,534,930 B2 *    3/2003    Ito et al. ..................... 315/291

\* cited by examiner

*Primary Examiner*—Rajnikant B. Patel
(74) *Attorney, Agent, or Firm*—Arent Fox LLP

(57) ABSTRACT

A control circuit for a DC-DC converter that prevents erroneous operations during high ON-duty operation. In response to an H-level pulse signal, a random delay circuit generates a delayed pulse signal that rises to an H level within one cycle of the pulse signal. The random delay circuit randomly changes the delay time of the delayed pulse signal. Even if noise causes the timing at which a current comparison signal rises to an H level to be delayed to later than the timing at which an H-level pulse signal is provided to the set terminal of an FF circuit, the FF circuit receives at its reset terminal an H-level delayed pulse signal that is provided prior to the H-level pulse signal. The FF circuit then inactivates the output transistor.

20 Claims, 9 Drawing Sheets

DC-DC CONVERTER AND CONTROL CIRCUIT FOR DC-DC CONVERTER

CROSS-REFERENCE TO RELATED APPLICATIONS

This application is based upon and claims the benefit of priority from the prior Japanese Patent Application No. 2005-024325, filed on Jan. 31, 2005, the entire contents of which are incorporated herein by reference.

BACKGROUND OF THE INVENTION

The present invention relates to a converter, and particularly, to a DC-DC converter and a control circuit for a DC-DC converter.

FIG. 1 is a schematic circuit diagram showing a current-mode DC-DC converter 1. The DC-DC converter 1 includes a control unit 2 and a converter unit. The converter unit includes an output transistor T1 configured by an N-channel MOS transistor, a synchronous rectifying transistor T2 configured by an N-channel MOS transistor, a Zener diode D1, a choke coil L1, a current detection resistor Rs, and a smoothing capacitor C1.

The control unit 2 generates complementary control signals DH and DL and provides the control signal DH to the gate of the output transistor T1 and the control signal DL to the gate of the synchronous rectifying transistor T2.

An input voltage Vi is supplied to the drain of the output transistor T1. When the control signal DH rises to H level, the output transistor T1 is activated and an output voltage Vo is generated at an output terminal via the choke coil L1 and the current detection resistor Rs. Upon the rising of the control signal DL to H level, the synchronous rectifying transistor T2 is activated, and the output voltage Vo is generated by the energy stored in the choke coil L1. The output voltage Vo is smoothed by the smoothing capacitor C1.

The control unit 2 receives the input voltage Vi as a power supply Vcc. The control unit 2 has a voltage amplifier 3 which receives voltage between the two terminals of the current detection resistor Rs, amplifies the voltage based on output current that is proportional to the voltage and flows through the current detection resistor Rs, and provides the amplified signal to the comparator 4.

The control unit 2 has an error amplifier 5, which amplifies a differential voltage between a voltage obtained by dividing the output voltage Vo by the resistors R1 and R2 and the output voltage of a reference power supply e1, and provides the amplified signal to the comparator 4. The voltage of the reference power supply e1 is set to be equal to the divided voltages of the resistor R1 and R2 when the output voltage Vo reaches a regulated value.

The comparator 4 compares the voltage of the amplified signal of the voltage amplifier 3 with the voltage of the amplified signal of the error amplifier 5. If the voltage of the amplified signal of the voltage amplifier 3 is higher than the voltage of the amplified signal of the error amplifier 5, the comparator 4 provides an H-level output signal to a reset terminal R of a flip-flop circuit (hereafter referred to as the "FF circuit") 7. If the voltage of the amplified signal of the voltage amplifier 3 is lower than the voltage of the amplified signal of the error amplifier 5, the comparator 4 provides an L-level output signal to the reset terminal R.

The FF circuit 7 has a set terminal S to which a pulse signal having a fixed frequency is provided from an oscillator 6. When an H-level pulse signal is applied to the set terminal S, the FF circuit 7 generates an H-level control signal DH at its output terminal Q, while generating an L-level control signal DL at its inverting output terminal /Q. When an H-level output signal is applied to the reset terminal R, the FF circuit 7 generates an L-level control signal DH and an H-level control signal DL.

The control unit 2 activates the output transistor T1 in fixed cycles in response to the rising of the pulse signal of the oscillator 6. When the output transistor T1 is activated, the current IL flowing through the choke coil L1 and the current detection resistor Rs is increased. This raises the voltage of a first amplified signal of the voltage amplifier 3. When the voltage of the amplified signal of the voltage amplifier 3 becomes higher than the voltage of the amplified signal of the error amplifier 5, an H-level output signal is provided to the reset terminal R of the FF circuit 7. The output transistor T1 is thereby inactivated and the synchronous rectifying transistor T2 is activated. As a result, the energy stored in the choke coil L1 is output.

If the output voltage Vo decreases during the activation and inactivation of the output transistor, the voltage of the amplified signal of the error amplifier 5 becomes higher than the voltage of the amplified signal of the voltage amplifier 3. The output signal of the comparator 4 then rises to an H level after a relatively long period of time. This lengthens the time for the output transistor T1 to be activated. If the output voltage Vo increases, the voltage of the amplified signal of the error amplifier 5 becomes lower than the voltage of the amplified signal of the voltage amplifier 3. The output signal of the comparator 4 then rises to H level after a relative short period of time. This shortens the time for the output transistor T1 to be activated. The output transistor T1 is thus activated repeatedly at fixed periods in response to the output signal frequency of the oscillator 6. The inactivation timing of the output transistor T1 is determined according to the increase rate of the output current IL. The inactivation timing of the output transistor T1 is thus changed in response to the increase and decrease of the output voltage Vo. This keeps the output voltage Vo constant.

In the current-mode DC-DC converter, when the ON duty (Ton/(Ton+Toff)) becomes higher than 50%, the increase rate (inclination of increase) of the current IL flowing through the choke coil L1 decreases. Thus, the change in the output signal (voltage increase rate) of the voltage amplifier 3 becomes moderate. Ton denotes the time during which the output transistor T1 is active, and Toff denotes the time during which the output transistor T1 is inactive. If the amplified signal of the voltage amplifier 3 includes noise, the noise will cause delay in the shifting of the signal of the comparator 4 (the timing of generating an H-level output signal will be offset). That is, the timing for providing an H-level output signal to the reset terminal R of the FF circuit 7 is delayed. An H-level signal is cyclically provided to the set terminal S of the FF circuit 7 from the oscillator 6. Therefore, the set terminal may be provided with an H-level pulse signal earlier than when the reset terminal R is provided with an H-level output signal. In such a case, the FF circuit 7 remains set thereby lengthening the set time. This state is equivalent to a state in which the FF circuit 7 is set by a signal with a lower frequency than the oscillatory frequency of the oscillator 6. This is referred to as low harmonic oscillation. In other words, erroneous circuit functioning caused by noise may cause low harmonic oscillation. As shown in FIG. 3, the output current IL increases when such low harmonic oscillation occurs. This increases the output voltage Vo. For this reason, the occurrence of low harmonic oscillation destabilizes the output voltage Vo.

FIG. 2 shows an example of a known DC-DC converter that prevents low harmonic oscillation caused by erroneous circuit functioning due to noise. This DC-DC converter has a slope compensation control function, which superimposes a correction voltage on a signal having a voltage corresponding to current IL flowing through a choke coil L1 (amplified signal of a voltage amplifier 3) with a slope compensation circuit 8 (e.g. variable power supply) to increase the voltage increase rate of the amplified signal. This function reduces signal shifting delays in the comparator 4 and prevents the occurrence of low harmonic oscillation even if noise is included in the amplified signal.

SUMMARY OF THE INVENTION

However, in the DC-DC converter of FIG. 2, the correction voltage is superposed on the waveform of an amplified signal corresponding to the current IL flowing through the choke coil L1. Therefore, the voltage supplied to the comparator 4 is higher than the voltage corresponding to the actual output current IL. That is, the comparator 4 generates an H-level signal when supplied with an output current IL that is lower than the set current. Consequently, the timing at which the flip-flop circuit 7 is reset becomes earlier and the output current IL is decreased. The decrease rate of the output current IL becomes higher as the ON duty of the output transistor T1 increases. The decrease of the output current IL becomes conspicuous in a range in which the ON duty exceeds 50%, and the decrease of the output current IL becomes especially sharp in a range in which the ON duty exceeds 80%.

The present invention provides a DC-DC converter for preventing erroneous operations when the ON duty is high, and a control circuit for such a DC-DC converter.

One aspect of the present invention is a DC-DC converter provided with a converter unit including an output transistor, of which activation and inactivation of the output transistor are controlled in accordance with a control signal, for generating output voltage of the DC-DC converter. A control unit connected to the converter unit generates the control signal that controls the activation and inactivation of the output transistor, in which the control signal has a duty. The control unit changes the duty of the control signal based on output current corresponding to the output voltage. The control unit includes a current detection circuit, connected to the converter unit, detects the output current and generating a detection signal. An oscillator generates a pulse signal. A delay circuit, connected to the oscillator, delays the pulse signal and generates a delayed pulse signal. The delay circuit changes the delay time of the pulse signal. A flip-flop circuit has a set terminal, for receiving the pulse signal of the oscillator, and a reset terminal, for receiving the earlier one of the detection signal of the current detection circuit and the delayed pulse signal. The flip-flop circuit generates the control signal with the duty in accordance with the pulse signal provided to the set terminal and the signal provided to the reset terminal.

Another aspect of the present invention is a DC-DC converter provided with a converter unit including an output transistor, of which activation and inactivation of the output transistor are controlled in accordance with a control signal, for generating output voltage of the DC-DC converter. A control unit connected to the converter unit generates the control signal that controls the activation and inactivation of the output transistor, in which the control signal has a duty. The control unit changes the duty of the control signal based on output current corresponding to the output voltage. The control unit includes a current detection circuit, connected to the converter unit, for detecting the output current and generating a detection signal. An oscillator generates a pulse signal. A delay circuit, connected to the oscillator, delays the pulse signal and generates a delayed pulse signal. The delay circuit changes the delay time of the pulse signal. A flip-flop circuit has a set terminal, for receiving the delayed pulse signal, and a reset terminal, for receiving the earlier one of the detection signal of the current detection circuit and the pulse signal of the oscillator. The flip-flop circuit generates the control signal with the duty in accordance with the delayed pulse signal provided to the set terminal and the signal provided to the reset terminal.

A further aspect of the present invention is a control circuit for generating a control signal for controlling activation and inactivation of an output transistor of a converter unit that generates output voltage of a DC-DC converter. The control signal has a duty. The control circuit changes the duty of the control signal based on output current corresponding to the output voltage. The control circuit includes a current detection circuit, connected to the converter unit, for detecting the output current and generating a detection signal. An oscillator generates a pulse signal. A delay circuit, connected to the oscillator, delays the pulse signal and generates a delayed pulse signal. The delay circuit changes the delay time of the pulse signal. A flip-flop circuit has a set terminal, for receiving the pulse signal of the oscillator, and a reset terminal, for receiving the earlier one of the detection signal of the current detection circuit and the delayed pulse signal. The flip-flop circuit generates the control signal with the duty in accordance with the pulse signal provided to the set terminal and the signal provided to the reset terminal.

Another aspect of the present invention is a control circuit for generating a control signal for controlling activation and inactivation of an output transistor of a converter unit that generates output voltage of a DC-DC converter. The control signal has a duty. The control circuit changes the duty of the control signal based on output current corresponding to the output voltage. The control circuit includes a current detection circuit, connected to the converter unit, for detecting the output current and generating a detection signal. An oscillator generates a pulse signal. A delay circuit, connected to the oscillator, delays the pulse signal and generates a delayed pulse signal. The delay circuit changes the delay time of the pulse signal. A flip-flop circuit has a set terminal, for receiving the delayed pulse signal, and a reset terminal, for receiving the earlier one of the detection signal of the current detection circuit and the pulse signal of the oscillator. The flip-flop circuit generates the control signal with the duty in accordance with the delayed pulse signal provided to the set terminal and the signal provided to the reset terminal.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
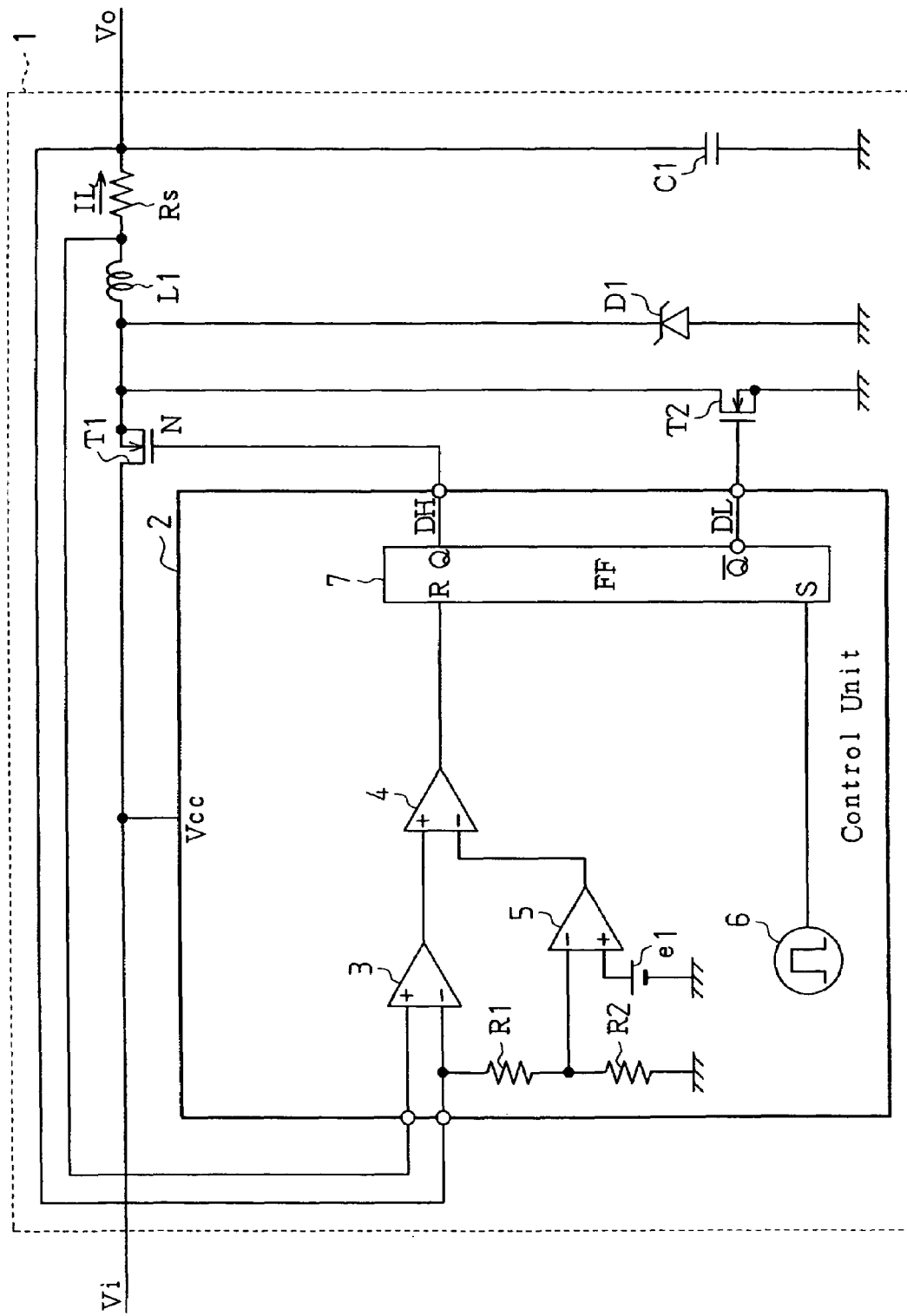
FIG. 1 is a schematic block circuit diagram of a conventional DC-DC converter.
Figure 2:
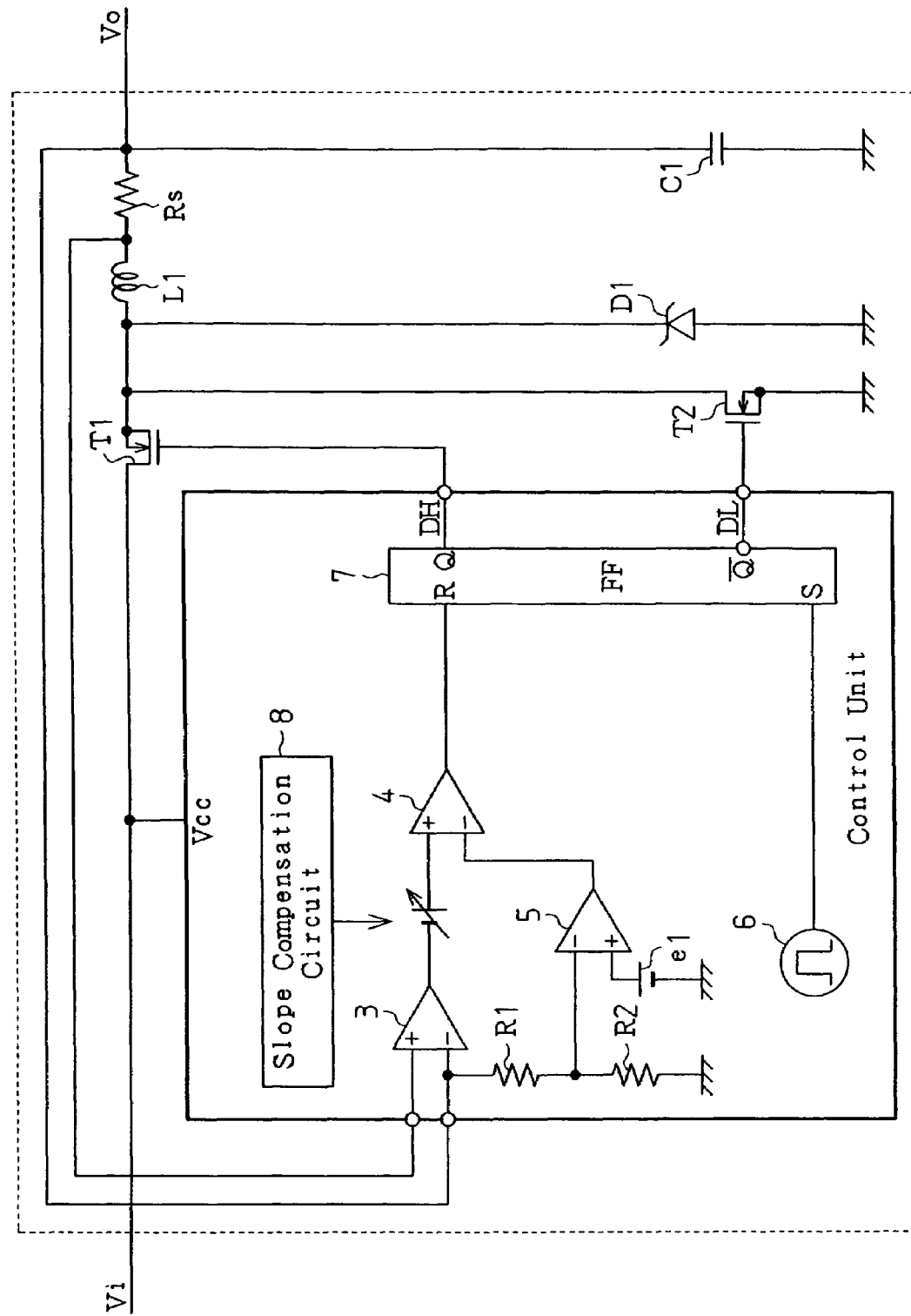
FIG. 2 is a schematic block circuit diagram of another conventional DC-DC converter.
Figure 3:
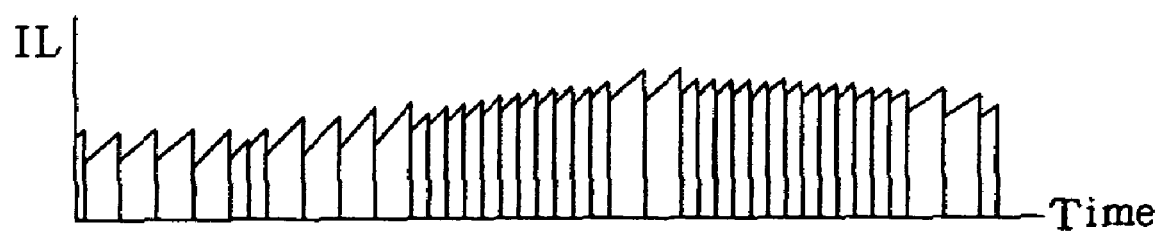
FIG. 3 is an operational waveform diagram of the DC-DC converter in FIG. 1.
Figure 3:
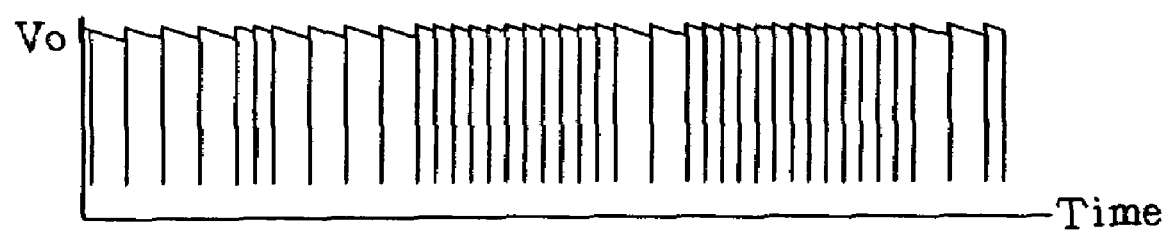

In the drawings, like numerals are used for like elements throughout.

Figure 4:
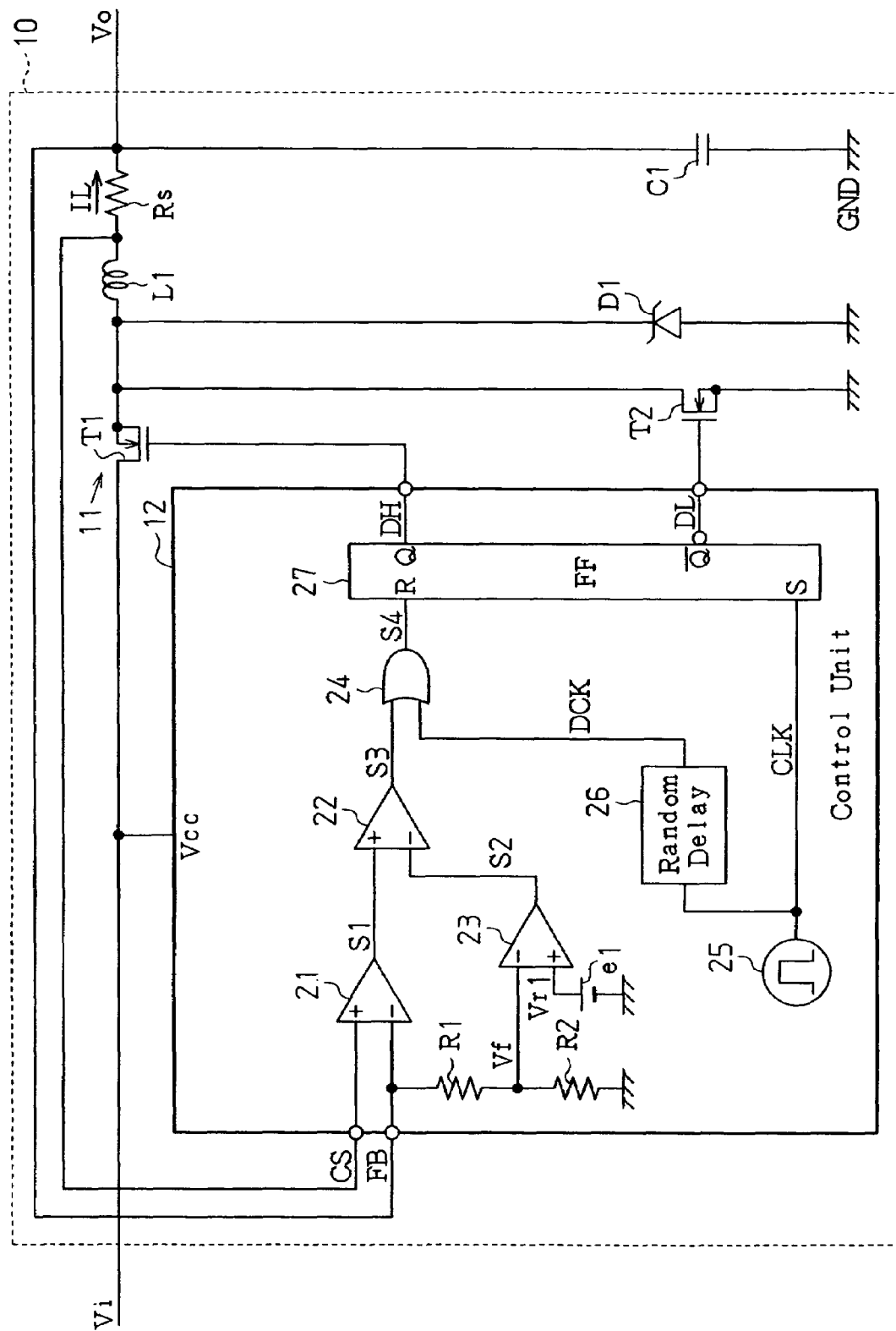
FIG. 4 is a schematic block circuit diagram of a DC-DC converter according to a first embodiment of the present invention.

As shown in FIG. 4, a DC-DC converter 10 according to a first embodiment of the present invention is a current-mode DC-DC converter including a converter unit 11 and a control unit 12, which serves as a control circuit.

The converter unit 11 includes an output transistor T1 configured by an N-channel MOS transistor, a synchronous rectifying transistor T2 configured by an N-channel MOS transistor, a Zener diode D1, a choke coil L1, a current detection resistor Rs, and a smoothing capacitor C1.

The output transistor T1 has a gate for receiving a control signal DH from the control unit 12, a drain for receiving an input voltage Vi, and a source connected to the synchronous rectifying transistor T2. The synchronous rectifying transistor T2 has a gate for receiving a control signal DL from the control unit 12, a drain connected to the output transistor T1, and a source connected to ground GND. The choke coil L1 has a first terminal connected to the output transistor T1 and a second terminal connected to the current detection resistor Rs. The current detection resistor Rs has a first terminal connected to the choke coil L1 and a second terminal connected to the smoothing capacitor C1. The capacitor C1 has a first terminal connected to the current detection resistor Rs and a second terminal connected to ground GND.

The control unit 12 generates a first control signal DH and a second control signal DL, which are complementary to each other. The output transistor T1 and the synchronous rectifying transistor T2 are complementarily activated and inactivated by the first and second control signals DH and DL. An input voltage Vi is decreased by activating and inactivating the transistors T1 and T2, and the decreased input voltage is generated as an output voltage Vo. The output voltage Vo is smoothed by a smoothing capacitor C1. The two terminals of the current detection resistor Rs are connected to the control unit 12, and signals CS and FB having potentials at the two terminals are fed back to the control unit 12.

The control unit 12 detects the current flowing through the choke coil L1 (that is, output current IL flowing through the current detection resistor Rs) based on the fed back signals SC and FB. Further, the control unit 12 generates control signals DH and DL that are to be provided to the converter unit 11 based on the output current IL to control the ON duty (active period and inactive period) of the output transistor T1.

The control unit 12 includes a voltage amplifier 21, a voltage comparator 22 serving as a current detection circuit, an error amplifier 23, an OR circuit 24, an oscillator 25, a random delay circuit 26, a flip-flop circuit (hereafter referred to as the "FF circuit") 27, a reference power supply e1, and two resistors R1 and R2.

The voltage amplifier 21 has a non-inverting input terminal, which receives the signal CS fed back from the converter unit 11, and an inverting input terminal, which receives the signal FB. The voltage amplifier 21 amplifies a potential difference between the fed back signals CS and FB to generate an amplified signal S1. The amplified signal S1 corresponds to the potential difference of the two terminals of the current detection resistor Rs (i.e., the value of the current IL flowing through the current detection resistor Rs). Accordingly, the voltage amplifier 21 generates an amplified signal S1 having a voltage corresponding to the voltage of the two terminals of the current detection resistor Rs (i.e., the current IL flowing through the current detection resistor Rs (choke coil L1)).

The fed back signal FB is provided to a first terminal of a first resistor R1. A second terminal of the first resistor R1 is connected to a first terminal of a second resistor R2, and a second terminal of the second resistor R2 is connected to ground GND. The node between the first and second resistors R1 and R2 is connected to the error amplifier 23. The first and second resistors R1 and R2 configure a voltage dividing circuit which divides the fed back signal FB according to the ratio of the resistance values of the first and second resistors R1 and R2 to generate a divided voltage Vf.

The error amplifier 23 has an inverting input terminal, which receives a signal having the divided voltage Vf of the signal FB, and a non-inverting input terminal, which receives a reference voltage Vr1 from the reference power supply e1. The reference voltage Vr1 is set to be equal with the divided voltage of the resistors R1 and R2 when the output voltage Vo reaches the regulated value. The error amplifier 23 compares the voltage Vf with the reference voltage Vr1 and generates an output signal S2 having a voltage level according to the comparison result. The error amplifier 23 generates an L-level output signal S2 when the voltage Vf is higher than the reference voltage Vr1. Further, the error amplifier 23 generates an H level output signal S2 when the voltage Vf is lower than the reference voltage Vr1.

The voltage comparator 22 has a non-inverting input terminal, which receives an amplified signal S1 from the voltage amplifier 21, and an inverting input terminal, which receives an output signal S2 from the error amplifier 23. The voltage comparator 22 compares the voltage of the amplified signal S1 with the voltage of the output signal S2, and provides a comparison signal S3 indicating the comparison result to the OR circuit 24. The voltage comparator 22 provides an H-level signal S3 to the OR circuit 24 when the voltage of the amplified signal S1 from the voltage amplifier 21 is higher than the voltage of the output signal S2 from the error amplifier 23. Further, the voltage comparator 22 provides an L-level signal S3 to the OR circuit 24 when the voltage of the amplified signal S1 is lower than the voltage of the output signal S2.

The oscillator 25 is a pulse oscillator, which performs oscillation to generate a pulse signal CLK having a fixed frequency, and provides the pulse signal CLK to the random delay circuit 26 and the FF circuit 27. The random delay circuit 26 delays the pulse signal CLK of the oscillator 25 to generate a delay signal DCK, and provides the delay signal DCK to the OR circuit 24. The random delay circuit 26 randomly sets the delay time of the delay signal DCK relative to the pulse signal CLK. The random delay circuit 26 sets the delay time of the delay signal DCK relative to the pulse signal CLK to a value less than one cycle of the pulse signal CLK. Hence, for example, the rising edge of the delay signal DCK appears within a period between the rising edge of the pulse signal CLK and the subsequent rising edge. In response to an H-level pulse signal CLK, for example, the random delay circuit 26 generates an H-level delay signal DCK after the randomly set delay time elapses from the first rise of the pulse signal CLK. The delay time is set within a period from the first rise to the next rise of the pulse signal CLK.

The OR circuit 24 receives the comparison signal S3 provided by the voltage comparator 22 and the delay signal DCK provided by the random delay circuit 26 to perform an OR operation with the comparison signal S3 and the delay signal DCK. Then, the OR circuit 24 provides an OR logic signal S4 having a voltage level corresponding to the operation result to the FF circuit 27.

The FF circuit 27 has a set terminal S for receiving the pulse signal CLK from the oscillator 25 and a reset terminal R for receiving the OR logic signal S4 from the OR circuit 24. The FF circuit 27 generates an H-level control signal DH at its output terminal Q and generates an L-level control signal DL at its inverting output terminal /Q, in response to an H-level pulse signal provided to the set terminal S. The FF circuit 27 generates an L-level control signal DH at the output terminal Q and generates an H level control signal DL at the inverting output terminal /Q in response to an H-level OR logic signal S4 provided to the reset terminal R.

The output transistor T1 is activated by an H-level control signal DH and inactivated by an L-level control signal DH. When the output transistor T1 is activated, current IL flowing through the choke coil L1 and the current detection resistor Rs is increased. This increases the output voltage of the voltage amplifier 21. When the output voltage of the voltage amplifier 21 becomes higher than the output voltage of the error amplifier 23, an H-level OR logic signal S4 is provided to the reset terminal R of the FF circuit 27. Thus, the output transistor T1 is inactivated and the synchronous rectifying transistor T2 is activated. The energy stored in the choke coil L1 is output.

When the output voltage Vo decreases during the activation and inactivation of the output transistor, the output voltage of the error amplifier 23 becomes higher than the output voltage of the voltage amplifier 21. Thus, the comparison signal S3 of the voltage comparator 22 rises to an H level after a relatively long time. This lengthens the active period of the output transistor T1. In contrast, when the output voltage Vo increases, the output voltage of the error amplifier 23 becomes lower than the output voltage of the voltage amplifier 21. The comparison signal S3 of the voltage comparator 22 rises to an H level in a relatively short time. This shortens the active period of the output transistor T1. In this manner, the output transistor T1 is cyclically activated in accordance with the frequency of the pulse signal CLK of the oscillator 25. The inactivation timing of the output transistor T1 is determined according to the increase rate of the output current IL. The inactivation timing changes in response to the increase and decrease of the output voltage Vo to keep the output voltage Vo constant.

The timing at which an L-level control signal DL is provided to the output transistor T1 is determined by the H-level OR logic signal S4 provided to the reset terminal R of the FF circuit 27. The timing at which the H-level OR logic signal S4 is provided is determined by the comparison signal S3 or delay signal DCK provided to the OR circuit 24.

Voltage of the comparison signal S3 is set according to the change in the output current IL and output voltage Vo. The delay signal DCK is a signal that is delayed so as to rise within one cycle of the pulse signal CLK. The OR circuit 24 logically synthesizes the comparison signal S3 with the delay signal DCK to generate an OR logic signal S4 having a voltage level obtained by the logic synthesis. Specifically, the OR circuit 24 generates an H-level OR logic signal S4 in response to an H-level comparison signal S3 or H-level delay signal DCK. Consequently, the FF circuit 27 is reset in response to the H-level OR logic signal S4 (i.e., the H-level comparison signal S3 or H-level delay signal DCK).

In response to an H-level signal CLK, the random delay circuit 26 generates an H-level delay signal DCK within one cycle of the signal CLK. Therefore, even if the timing at which the comparison signal S3 rises to H-level is delayed by noise to later than the timing at which an H-level signal CLK is provided to the set terminal S of the FF circuit 27, the FF circuit 27 is reset by an H-level delay signal DCK that is provided prior to the H-level signal CLK. Accordingly, the control unit 12 prevents the occurrence of low harmonic oscillation, which would cause the FF circuit 27 to be reset by a lower frequency than the oscillatory frequency of the oscillator 25.

The delay time set by the random delay circuit 26 will now be described.

The delay time is set according to input and output characteristics of the step-down DC-DC converter 10 (i.e., ratio of output voltage Vo to input voltage Vi (ON duty value of the output transistor T1)).

The output voltage Vo is represented by the equation:

$$Vo=Vi \times (Ton/(Ton+Toff))=Vi \times (Ton/T)$$

where Ton denotes the time during which the output transistor T1 is active, Toff denotes the time during which the output transistor T1 is inactive, and T is Ton+Toff (i.e., a period of one cycle of the pulse signal CLK of the oscillator 25).

For example, when the input voltage Vi is set to 5 V and the output voltage Vo to 4.5 V, the ON duty (Ton/T) of the output transistor T1 is set to 90%. In this case, the control unit 12 converts the 5 V input voltage Vi into 4.5 V output voltage Vo by activating and inactivating the output transistor T1 at a duty of 80% to 99%, taking into consideration the delay of timing at which the comparison signal S3 rises. In other words, the output transistor T1 is normally activated and inactivated at a duty of 90% and provided with a comparison signal S3 from the voltage comparator 22.

The random delay circuit 26 generates a delay signal DCK so as to rise later than the rising timing of the comparison signal S3 and earlier than the rising timing of the pulse signal CLK which sets the FF circuit 27 (i.e., such that the output transistor T1 is activated and inactivated with a duty of 80 to 99%). That is, the delay time of the delay signal DCK has a margin. The margin of the delay time is for preventing problems that may arise when the delay time is set to a fixed value. Specifically, if the delay time is set corresponding to the duty of 99%, the timing of the delay signal DCK becomes cyclic and the output current IL is increased. If the delay time is set corresponding to the duty of 85%, the reset timing of the FF circuit 27 becomes earlier than the actual reset timing, which may decrease the output current IL. Since the delay time is set randomly, the FF circuit 27 can be reset by the delay signal DCK that is earlier than the comparison signal S3 even when the voltage comparator 22 is operating normally to output the comparison signal S3. However, the random setting of the delay time enables a desired output voltage Vo to be obtained on average.

Even if the output voltage Vo is not 4.5 V (a circuit with a duty of 80% or more), a circuit in which the delay time of the delay signal DCK is set randomly can be applied in a similar manner.

The DC-DC converter 10 of the first embodiment has the advantages described below.

(1) In response to an H-level pulse signal CLK, the random delay circuit 26 generates an H-level delay signal DCK while randomly changing the delay time of the delay signal DCK within one cycle of the pulse signal CLK. Therefore, even if noise delays the timing at which the comparison signal S3 rises to an H level to later than the timing at which the H-level signal CLK is provided to the set terminal S of the FF circuit 27, the FF circuit 27 performs a reset operation in response to an H-level delay signal DCK that is provided prior to the H-level pulse signal CLK. This inactivates the output transistor T1. Consequently, the control unit 12 prevented the occurrence of low harmonic oscillation that would cause the FF circuit 27 to be reset with a lower frequency than the oscillatory frequency of the oscillator 25.

(2) The random delay circuit 26 generates a delay signal DCK in accordance with a delay time that is set to randomly activate and inactivate the output transistor T1 at a duty from 80 to 99%. If the delay time set to a fixed value, the timing of the delay signal DCK becomes cyclic, which will offset the output current IL from a desire value. Therefore, the delay time is changed randomly so that an average output current IL becomes closer to the desired value, and the desired output voltage Vo is be obtained on average.

Figure 5:
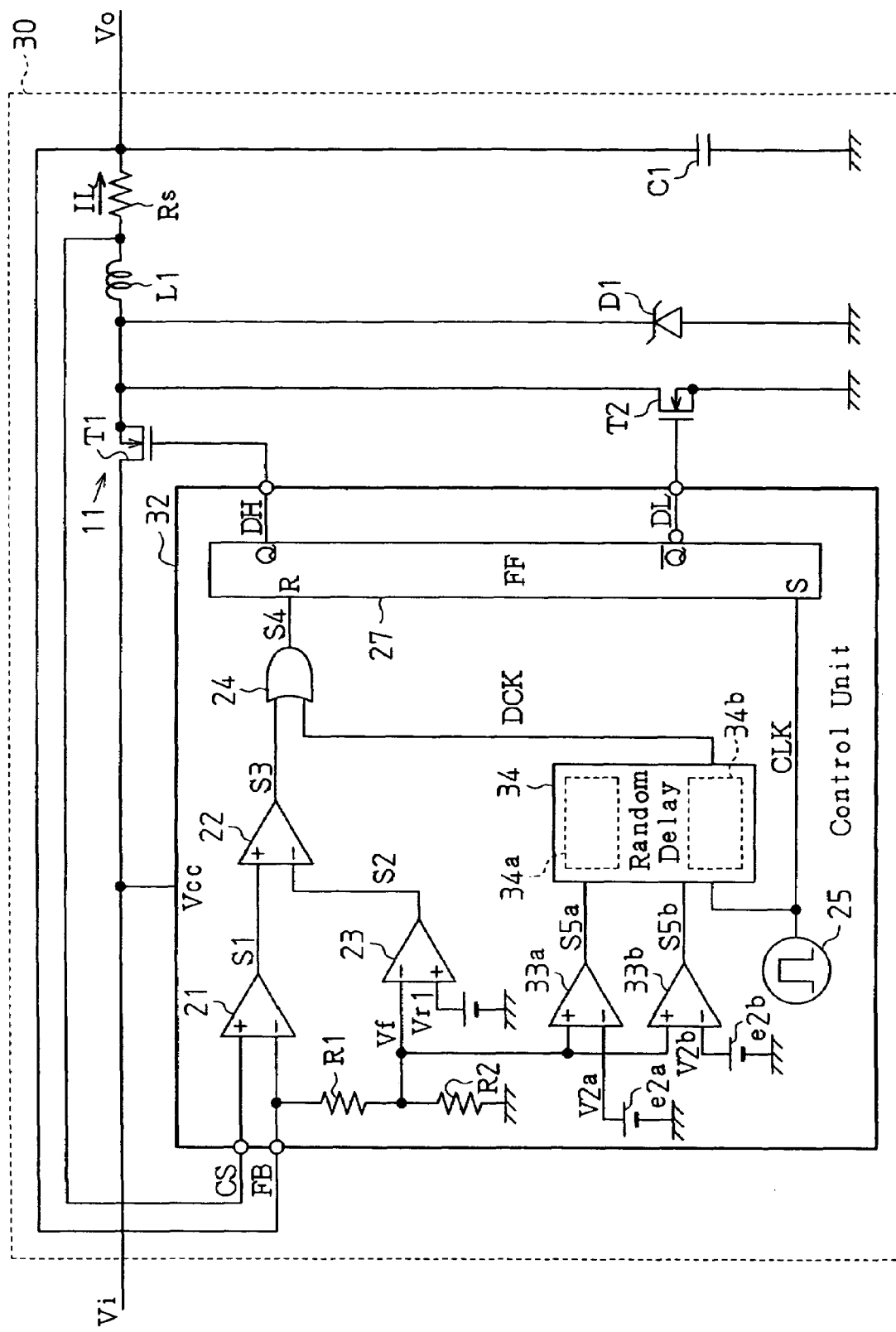
FIG. 5 is a schematic block circuit diagram of a DC-DC converter according to a second embodiment of the present invention.

Referring to FIG. 5, a DC-DC converter 30 according to a second embodiment of the present invention is a current-mode DC-DC converter that includes a converter unit 11 and a control unit 32.

The control unit 32 includes a voltage amplifier 21, a voltage comparator 22, an error amplifier 23, an OR circuit 24, an oscillator 25, a flip-flop circuit (hereafter referred to as the "FF circuit") 27, a reference power supply e1, two resistors R1 and R2, two voltage comparators 33a and 33b serving as voltage detection circuits, a random delay circuit 34, and two reference power supplies e2a and e2b.

The voltage comparator 33a has an inverting input terminal, which receives a signal having a divided voltage Vf obtained by dividing the voltage of a signal FB, and a non-inverting input terminal, which receives a reference voltage V2a from the reference power supply e2a. The voltage comparator 33b has an inverting input terminal, which receives a signal having the divided voltage Vf, and a non-inverting input terminal, which receives a reference voltage V2b from the reference power supply e2b. The reference voltages V2a and V2b are set such that a delay time range (range in which the ON duty of the output transistor T1 is changed) is divided into two or more (into three in this case). In other words, the two voltage comparators 33a and 33b are comparators for dividing the range of delay time into three and indicating the divided range in which the output voltage Vo is currently included. The voltage comparator 33a generates an H-level or L-level signal S5a in accordance with the result of the comparison between the reference voltage V2a and the output voltage Vo (divided voltage Vf). The voltage comparator 33b generates an H-level or L-level signal S5b according to the result of the comparison between the reference voltage V2b and the output voltage Vo (divided voltage Vf).

The random delay circuit 34 has a plurality of (in this case, two) random delay circuits 34a and 34b. Each of the random delay circuits 34a and 34b delays the pulse signal CLK provided by the oscillator 25 to generate a delay signal, while randomly setting the delay time of the delay signal relative to the pulse signal CLK. The random delay circuits 34a and 34b are set to have different delay ranges for the delay signal. For example, the first random delay circuit 34a generates a first delay signal in a first delay range (e.g., in the range of 80 to 90% duty), while the second random delay circuit 34b generates a second delay signal in a second delay range (e.g., in the range of 90 to 99% duty).

The random delay circuit 34 receives output signals S5a and S5b from the first and second voltage comparators 33a and 33b to generate a first delay signal or a second delay signal based on the output signals S5a and S5b. If the output voltage Vo of the DC-DC converter 30 is relatively high, based on the output signals S5a and S5b, the random delay circuit 34 decreases the ON duty of the output transistor T1 and generates a delay signal which decreases the output voltage Vo. If the output voltage Vo is relatively low, the random delay circuit 34 increases the ON duty of the output transistor T1 and generates a delay signal which will increase the output voltage Vo.

The first voltage comparator 33a generates an H-level signal S5a when the output voltage Vo is higher than the reference voltage V2a, and generates an L-level signal S5a when the output voltage Vo is lower than the reference voltage V2a. The second voltage comparator 33b outputs an H-level signal S5b when the output voltage Vo is higher than the reference voltage V2b, and generates an L-level signal S5b when the output voltage Vo is lower than the reference voltage V2b. The reference voltage V2a is set higher than the reference voltage V2b (V2a>V2b). Accordingly, if the output voltage Vo is higher than the reference voltage V2a, the first and second voltage comparators 33a and 33b generate H-level signals S5a and S5b, respectively. If the output voltage Vo is lower than the reference voltage V2a and higher than the reference voltage V2b, the first voltage comparator 33a generates an L-level signal S5a, while the second voltage comparator 33b generates an H-level signal S5b. If the output voltage Vo is lower than the reference voltage V2b, the first and second voltage comparators 33a and 33b generate L-level signals S5a and S5b, respectively.

When the output voltage Vo is higher than the reference voltage V2a, the random delay circuit 34 provides, in response to the H-level signals S5a and S5b, the first delay signal (with a delay range of 80 to 90%) generated by the first random delay circuit 34a to the OR circuit 24 as the delay signal DCK. When the output voltage Vo is lower than the reference voltage V2a and higher than the reference voltage V2b, the random delay circuit 34 provides, in response to the L-level signal S5a and H-level signal S5b, either the first delay signal generated by the first random delay circuit 34a or the second delay signal (with a delay range of 90 to 99%) generated by the second random delay circuit 34b, to the OR circuit 24 as the delay signal DCK. When the output voltage Vo is lower than the reference voltage V2b, the random delay circuit 34 provides, in response to L-level signals S5a and S5b, the second delay signal generated by the second random delay circuit 34b to the OR circuit 24 as the delay signal DCK.

The DC-DC converter 30 of the second embodiment has the advantages described below.

(1) Like the first embodiment, the DC-DC converter 30 prevents the occurrence of low harmonic oscillation.

(2) The random delay circuit 34 includes the first random delay circuit 34a, which generates a first delay signal with a delay range corresponding to the range of duty of 80 to 90%, and the second random delay circuit 34b, which generates a second delay signal with a delay range corresponding to the range of duties of 90 to 99%. The random delay circuit 34 thus provides the first delay signal or second delay signal to the OR circuit 24 as the delay signal DCK. Accordingly, when the output voltage Vo is relatively high, the ON duty of the output transistor T1 becomes low, the output current IL is decreased, and the output voltage Vo is decreased. When the output voltage Vo is relatively low, the ON duty of the output transistor T1 becomes high, the output current IL is increased, and the output voltage Vo rises. As a result, the output voltage Vo of a desired value is obtained.

Figure 6:
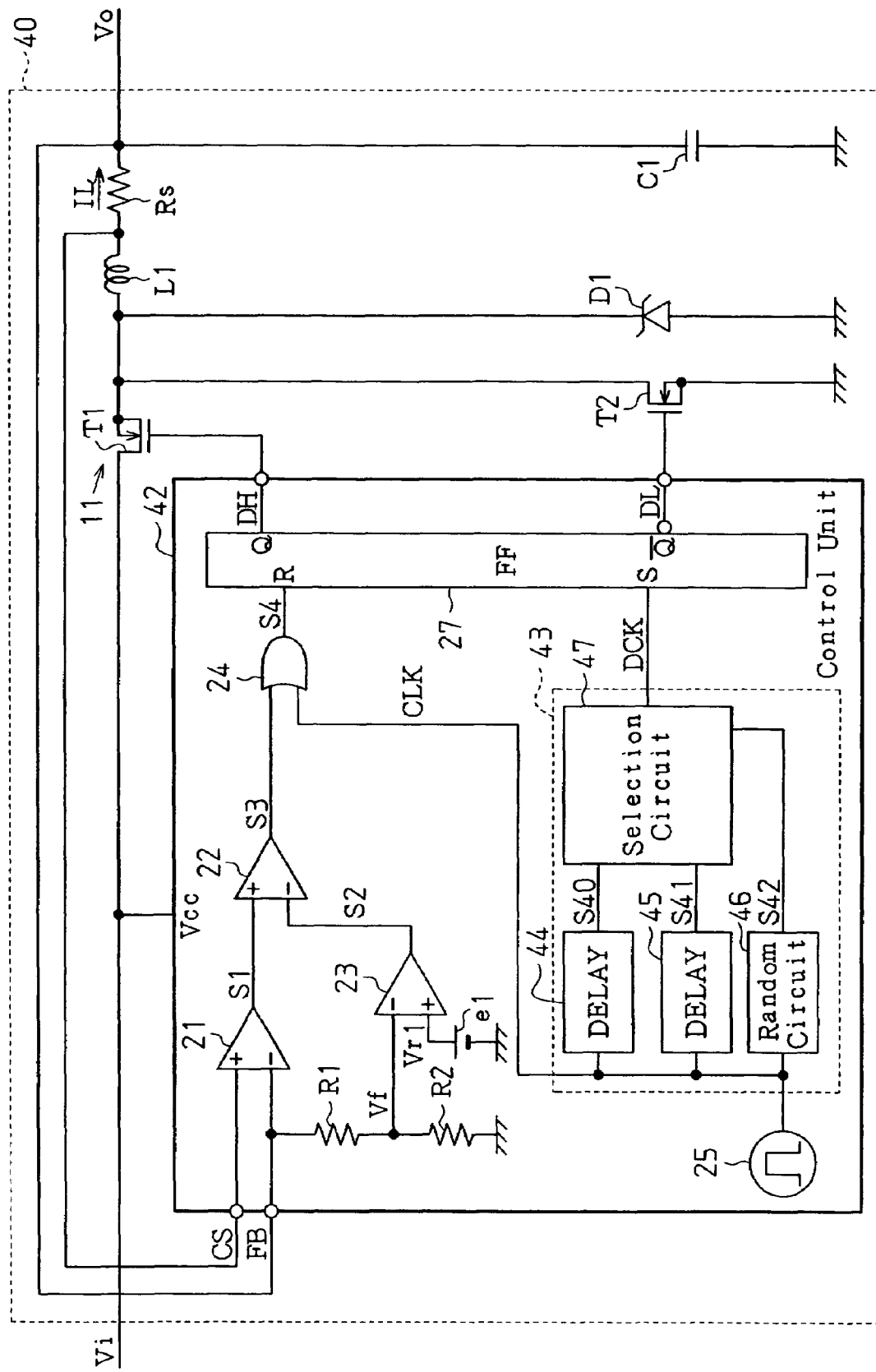
FIG. 6 is a schematic block circuit diagram of a DC-DC converter according to a third embodiment of the present invention.

Referring to FIG. 6, a DC-DC converter 40 according to a third embodiment of the present invention is a current-mode DC-DC converter and includes a converter unit 11 and a control unit 42.

The control unit 42 includes a voltage amplifier 21, a voltage comparator 22, an error amplifier 23, an OR circuit 24, an oscillator 25, a random delay circuit 43, a flip-flop circuit (hereafter referred to as "FF circuit") 27, a reference power supply e1, and resistors R1 and R2.

The oscillator 25 is a pulse oscillator which performs oscillation to generate a pulse signal having a fixed frequency and provides the pulse signal CLK to the random delay circuit 43 and the OR circuit 24. The OR circuit 24 receives a comparison signal S3 provided by the voltage comparator 22 and the pulse signal CLK provided by the oscillator 25 to perform an OR operation on the comparison signal S3 and the pulse signal CLK. The oscillator 25 then provides an OR logic signal S4 having a voltage level corresponding to the OR operation result to the FF circuit 27.

The random delay circuit 43 delays the pulse signal CLK of the oscillator 25 to generate a delay signal DCK, and provides the delay signal DCK to the FF circuit 27. The random delay circuit 43 includes a plurality of (in this case, two) delay circuits 44 and 45, a random circuit 46, and a selection circuit 47.

The first delay circuit 44 delays the pulse signal CLK of the oscillator 25 to generate a first delay signal S40. The delay time of the first delay signal S40 relative to the pulse signal CLK is fixed and set to 20% of one cycle of the pulse signal CLK. The second delay circuit 45 delays the pulse signal CLK of the oscillator 25 to generate a second delay signal S41. The delay time of the second delay signal S41 relative to the pulse signal CLK is fixed and set to 1% of one cycle of the pulse signal CLK. Based on the pulse signal CLK, the random delay circuit 43 delays the pulse signal CLK by 20% of one cycle to generate the first delay signal S40, while delaying the pulse signal CLK by 1% of one cycle to generate the second delay signal S41.

Using the pulse signal CLK, the random circuit 46 generates a selection signal S42, which randomly reaches an H-level and L-level as time elapses. The selection signal S42 generated by the random circuit 46 has a pseudo-random noise (PN) code.

Figure 7:
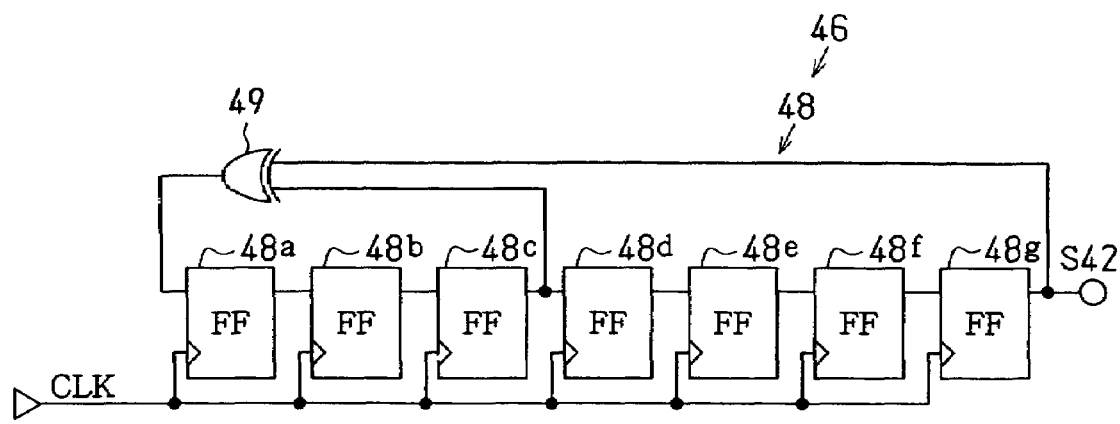
FIG. 7 is a schematic block circuit diagram of a random circuit of the DC-DC converter of FIG. 6.

FIG. 7 is a schematic circuit diagram showing the random circuit 46.

Figure 8:
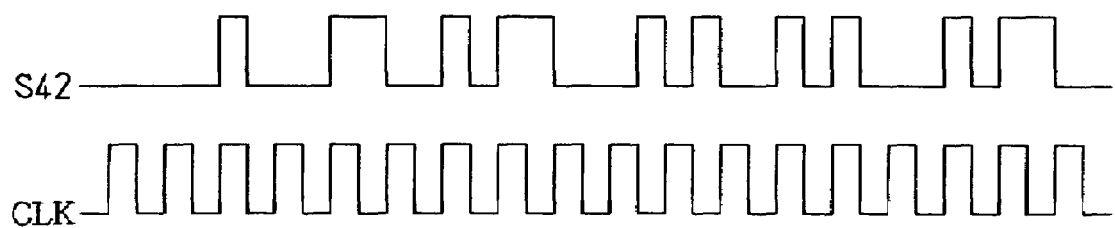
FIG. 8 is an output waveform diagram of the random circuit of FIG. 7.

The random circuit 46 includes a shift register 48 having a plurality of bits (in this case, seven bits), and an exclusive OR circuit (EOR circuit) 49. The shift register 48 includes seven flip-flop circuits (FF circuits) 48a to 48g that are connected in series to one another. Each of the FF circuits 48a to 48g has a clock terminal receiving the pulse signal CLK, an input terminal, and an output terminal connected to the input terminal of the next-stage FF circuit. The EOR circuit 49 has a first input terminal connected to the output terminal of the third-stage FF circuit 48c, a second input terminal connected to the output terminal of the last-stage FF circuit 48g, and an output terminal connected to the input terminal of the first-stage FF circuit 48a. The random circuit 46 generates a selection signal S42 at a random timing. The selection signal S42 has random pulse width, as shown in FIG. 8.

The selection circuit 47 receives the first and second delay signals S40 and S41 and the selection signal S42. Then, the selection circuit 47 outputs either the first delay signal S40 or second delay signal S41 as a delay signal DCK in accordance with the selection signal S42. The selection signal S42 is a pulse signal that is generated with random timing and has a random pulse width. Therefore, the selection circuit 47 randomly selects either the first delay signal S40 or second delay signal S41 and outputs the selected one as the delay signal DCK.

The FF circuit 27 has a set terminal S, which receives the delay signal DCK provided by the random delay circuit 43, and a reset terminal R, which receives the OR logic signal S4 of the OR circuit 24. In response to an H-level signal provided to the set terminal S, the FF circuit 27 generates an H-level control signal DH at the output terminal Q, while generating an L-level control signal DL at the inverting output terminal /Q. In response to an H-level signal provided to the reset terminal R, the FF circuit 27 generates an L-level control signal DL at the output terminal Q, while generating an H-level control signal DH at the inverting output terminal /Q.

The FF circuit 27 is set in response to the delay signal DCK and cyclically reset in response to the pulse signal CL. The random delay circuit 43 generates a first delay signal S40 that is delayed by 20% of one cycle of the pulse signal CLK and a second delay signal S41 that is delayed by 1% of one cycle of the pulse signal CLK. That is, the control unit 42 of the third embodiment randomly changes the interval from when the FF circuit 27 is reset to when the FF circuit 27 is set. Conversely, the control units 12 and 32 of the first and second embodiments randomly change the interval from when the FF circuit is set to when the FF circuit 27 is reset. The interval from when the FF circuit 27 is reset to when the FF circuit 27 is set is the time during which the output transistor T1 is kept inactive. That is, the control unit 42 randomly changes the OFF duty of the output transistor T1. In the third embodiment, the random change is performed by randomly setting the OFF duties of 20% and 1%. In other words, the random change is performed by randomly setting the ON duties of 80% and 99%.

After being set, the FF circuit 27 is reset by an H-level pulse signal CLK, which is provided by the OR circuit 24 at a timing of 80% or 99% of the ON duty, or by a comparison signal S3 provided by the voltage comparator 22. Therefore, even if the timing at which the comparison signal S3 rises to an H level is delayed by noise to later than the timing at which an H-level pulse signal CLK is provided to the set terminal S of the FF circuit 27, the FF circuit 27 is reset by an H-level pulse signal CLK that is cyclically provided. As a result, the control unit 32 prevents the occurrence of low harmonic oscillation that would reset the FF circuit 27 with a lower frequency than the oscillatory frequency of the oscillator 25.

The DC-DC converter 40 of the third embodiment has the advantage described below.

The random delay circuit 43 delays the pulse signal provided to the set terminal of the FF circuit 27 to substantially change the ON duty of the output transistor T1. The delay time by the random delay circuit 43 is relatively short. This enables the use of a circuit with a relatively small circuit area. The circuit area of the random delay circuit 43 is relatively small, which suppresses the increase of the area of the DC-DC converter 40. This suppresses enlargement of printed circuit boards and electronic devices incorporating the DC-DC converter 40.

Figure 9:
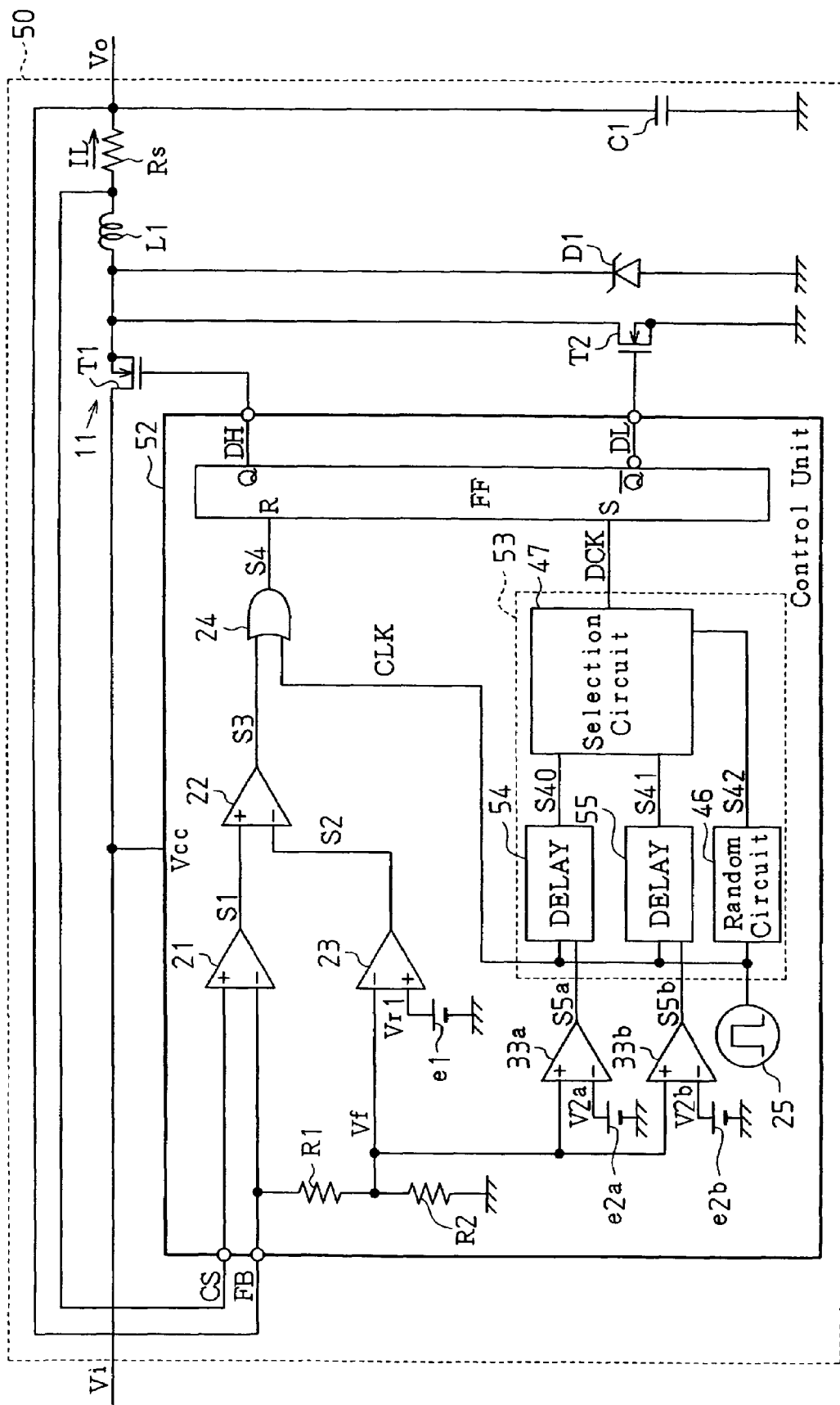
FIG. 9 is a schematic block circuit diagram of a DC-DC converter according to a fourth embodiment of the present invention.

Referring to FIG. 9, a DC-DC converter 50 according to a fourth embodiment of the present invention is a current-mode DC-DC converter including a converter unit 11 and a control unit 32.

The control unit 32 includes a voltage amplifier 21, a voltage comparator 22, an error amplifier 23, an OR circuit 24, an oscillator 25, a flip-flop circuit (hereafter referred to as the "FF circuit") 27, a reference power supply e1, two resistors R1 and R2, two voltage comparators 33*a* and 33*b*, a random delay circuit 53, and two reference power supplies e2*a* and e2*b*.

The two voltage comparators 33*a* and 33*b* divide the delay time range into three and indicate the range in which the output voltage Vo is currently included. The voltage comparator 33*a* generates an H-level or L-level output signal S5*a* based on a result of comparison between a reference voltage V2*a* and the output voltage Vo (divided voltage Vf). The voltage comparator 33*b* generates an H-level or L-level output signal S5*b* based on the result of comparison between a reference voltage V2*b* and the output voltage Vo (divided voltage Vf).

The random delay circuit 53, which receives output signals S5*a* and S5*b* from the voltage comparators 33*a* and 33*b* and a pulse signal CLK from the oscillator 25, delays the pulse signal CLK to generate a delay signal DCK, while changing the delay time of the delay signal DCK relative to the pulse signal CLK, based on the output signals S5*a* and S5*b*. The output signals S5*a* and S5*b* of the voltage comparators 33*a* and 33*b* correspond to the output voltage Vo. Accordingly, the random delay circuit 53 changes the delay time of the delay signal DCK in accordance with to the output voltage Vo.

The random delay circuit 53 includes a plurality of (in this case, two) delay circuits 54 and 55, a random circuit 46, and a selection circuit 47.

The first delay circuit 54 receives a pulse signal CLK from the oscillator 25 and an output signal S5*a* from the voltage comparator 33*a*, and delays the pulse signal by various delay times to generate a plurality of delay signals. The first delay circuit 54 then selects one of the plurality of delay signals in accordance with the output signal S5*a* and outputs the selected delay signal as a delay signal S40.

Figure 10:
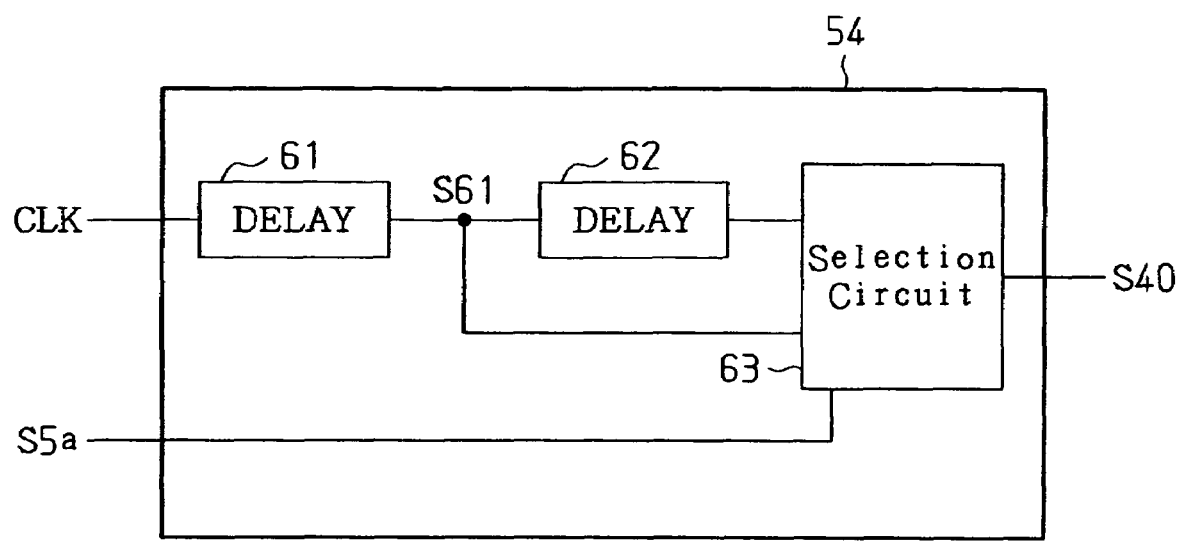
FIG. 10 is a schematic circuit diagram of a delay circuit of the DC-DC converter in FIG. 9.

FIG. 10 is a schematic block diagram showing the first delay circuit 54. The first delay circuit 54 includes a plurality of (in this case, two) delay circuits 61 and 62, and a selection circuit 63. Each of the delay circuits 61 and 62 delays the pulse signal by a predetermined fixed time to generate a delay signal. The delay circuit 61 delays the pulse signal by a time corresponding to 10% of one cycle of the pulse signal CLK. The delay circuit 61 generates a delay signal S61 obtained by delaying the pulse signal CLK, while the delay circuit 62 generates a delay signal S62 obtained by further delaying the delay signal S61. The delay signal S62 is delayed relative to the pulse signal CLK by a time corresponding to 20% of one cycle of the pulse signal CLK. Consequently, the first delay circuit 54 receives the pulse signal CLK, and generates the delay signal S61 that is delayed by 10% of one cycle of the pulse signal CLK and the delay signal S62 that is delayed by 20% of one cycle of the pulse signal CLK.

The selection circuit 63 receives the delay signals S61 and S62 and an output signal S5*a* from the voltage comparator 33*a*, selects one of the delay signals S61 and S62 in response to the output signal S5*a*, and outputs the selected delay signal S40. If the output voltage Vo is higher than the reference voltage V2*a*, the output signal S5*a* rises to an H level. If the output voltage Vo is lower than the reference voltage V2*a*, the output signal S5*a* falls to an L level. In response to an H-level output signal S5*a*, the selection circuit 63 selects the delay signal S62 having a long delay time relative to the pulse signal CLK. In response to an L-level output signal S5*a*, the selection circuit 63 selects the delay signal S61 having a short delay time relative to the pulse signal CLKt.

When the output voltage Vo is higher than the reference voltage V2*a*, the first delay circuit 54 selects the delay signal S40 that has been delayed by 20% of one cycle of the pulse signal CLK of the oscillator 25. When the output voltage Vo is lower than the reference voltage V2*a*, the first delay circuit 54 selects the delay signal S40 that has been delayed by 10% of one cycle of the pulse signal CLK.

The second delay circuit 55 has a configuration similar to that of the first delay circuit 54 but has a different delay time from that of the first delay circuit 54. The second delay circuit 55 receives a pulse signal CLK and generates a delay signal that is delayed by 1% of one cycle of the pulse signal CLK and a delay signal that is delayed by 10% of one cycle of the pulse signal CLK. Accordingly, when the output voltage Vo is higher than the reference voltage V2*b*, the second delay circuit 55 selects a delay signal S41 delayed by 10% of one cycle of the pulse signal CLK of the oscillator 25. When the output voltage Vo is lower than the reference voltage V2*b*, the second delay circuit 55 selects a delay signal S41 delayed by 1% of one cycle of the pulse signal CLK.

The random circuit 46, like that of the third embodiment, generates a selection signal S42 that has a random pulse width and is generated at random timing. The selection circuit 47 randomly selects either the first delay signal S40 or the second delay signal S41 and outputs the selected delay signal as the delay signal DCK.

When the output voltage Vo is higher than the reference voltage V2*a*, the random delay circuit 53 selects, in response to H-level output signals S5*a* and S5*b*, either the first delay signal S40 delayed by 20% or the second delay signal S41 delayed by 10%. Then, the random delay circuit 53 provides the selected delay signal DCK to the OR circuit 24. Delaying the pulse signal provided to the set terminal of the FF circuit 27 by 20% or 10% corresponds to setting the OFF duty of the output transistor T1 to 20% or 10%, that is, setting the ON duty of the output transistor T1 to 80% or 90%. Therefore, the random delay circuit 53 generates a delay signal DCK to control activation and inactivation of the output transistor T1 with an 80 or 90% ON duty.

When the output voltage Vo is lower than the reference voltage V2*a* and higher than the reference voltage V2*b*, the random delay circuit 53 randomly selects, in response to an L-level output signal S5*a* and H-level output signal S5*b*, a first delay signal S40 and a second delay signal S41, each of which is delayed by 10%, and provides the selected delay signal DCK to the OR circuit 24. Accordingly, the random delay circuit 53 generates a delay signal DCK to control activation and inactivation of the output transistor T1 with a 90% ON duty.

When the output voltage Vo is lower than the reference voltage V2b, the random delay circuit 53 randomly selects, in response to L-level output signals S5a and S5b, the first delay signal S40 delayed by 10% or the second delay signal S41 delayed by 1%, and provides the selected delay signal DCK to the OR circuit 24. Accordingly, the random delay circuit 53 generates a delay signal DCK to control activation and inactivation of the output transistor T1 with a 90 or 99% ON duty.

When the output voltage Vo of the DC-DC converter 50 is relatively high based on the output signals S5a and S5b, the random delay circuit 53 decreases the ON duty of the output transistor T1 and generates a delay signal DCK to lower the output voltage Vo. When the output voltage Vo is relatively low, the random delay circuit 53 increases the ON duty of the output transistor T1 and generates a delay signal DCK to increase the output voltage Vo.

The DC-DC converter 50 of the fourth embodiment has the advantages described below.

(1) When the output voltage Vo is higher than the reference voltage V2a, the random delay circuit 53 randomly selects, in response to H-level signals S5a and S5b, either the first delay signal S40 delayed by 20% or the second delay signal S41 delayed by 10%. Then, the random delay circuit 53 provides the selected delay signal DCK to the OR circuit 24. Delaying the pulse signal provided to the set terminal of the FF circuit 27 by 20% or 10% corresponds to setting the OFF duty of the output transistor T1 to 20% or 10%, that is, corresponds to setting the ON duty of the output transistor T1 to 80% or 90%. Consequently, the random delay circuit 53 generates a delay signal DCK to control activation and inactivation of the output transistor T1 with an 80 or 90% ON duty. As a result, the controller 52 prevents the occurrence of low harmonic oscillation, which would reset the FF circuit 27 at a lower frequency than the oscillatory frequency of the oscillator 25.

(2) The first and second delay circuits 54 and 55 of the random delay circuit 53 generate a plurality of delay signals by delaying the pulse signal by a predetermined fixed time. Since the delay time is fixed, the circuit configuration may be simplified and enlargement of the circuit area may be suppressed.

(3) When the output voltage Vo is relatively high, based on the output signal S5a or S5b of the associated voltage comparator 33a or 33b detecting the output voltage Vo, the first and second delay circuits 54 and 55 each generate a delay signal to decrease the ON duty of the output transistor T1. When the output voltage Vo is relatively low, the first and second delay circuits 54 and 55 each generate a delay signal to increase the ON duty of the output transistor T1. Accordingly, the desired output voltage Vo may be obtained.

It should be apparent to those skilled in the art that the present invention may be embodied in many other specific forms without departing from the spirit or scope of the invention. Particularly, it should be understood that the present invention may be embodied in the following forms.

The delay range of the delay signal DCK may be altered as required.

In the second and fourth embodiments, the reference voltages V2a and V2b provided to the voltage comparators 33a and 33b may be the same.

In the first embodiment, the random delay circuit 43 of the third embodiment may be used in place of the random delay circuit 26.

In the second embodiment, the random delay circuit 53 of the fourth embodiment may be used in place of the random delay circuit 34.

In the third embodiment, the random delay circuit 26 of the first embodiment may be used in place of the random delay circuit 43.

In the fourth embodiment, the random delay circuit 34 of the second embodiment may be used in place of the random delay circuit 53.

The present invention is applicable not only to the step-down DC-DC converters 10, 30, 40 and 50 but also to step-up DC-DC converters, DC-DC converters generating a negative voltage, and DC-DC converters generating various voltages.

The present invention is also applicable to multiphase DC-DC converters including a plurality of converter units and a plurality of control units.

The present examples and embodiments are to be considered as illustrative and not restrictive, and the invention is not to be limited to the details given herein, but may be modified within the scope and equivalence of the appended claims.

What is claimed is:

1. A DC-DC converter comprising:
   a converter unit including an output transistor, of which activation and inactivation of the output transistor are controlled in accordance with a control signal, for generating output voltage of the DC-DC converter; and
   a control unit, connected to the converter unit, for generating the control signal that controls the activation and inactivation of the output transistor, in which the control signal has a duty, in which the control unit changes the duty of the control signal based on output current corresponding to the output voltage, the control unit including;
      a current detection circuit, connected to the converter unit, for detecting the output current and generating a detection signal;
      an oscillator for generating a pulse signal;
      a delay circuit, connected to the oscillator, for delaying the pulse signal and generating a delayed pulse signal, the delay circuit changing the delay time of the pulse signal; and
      a flip-flop circuit having a set terminal, for receiving the pulse signal of the oscillator, and a reset terminal, for receiving the earlier one of the detection signal of the current detection circuit and the delayed pulse signal, wherein the flip-flop circuit generates the control signal with the duty in accordance with the pulse signal provided to the set terminal and the signal provided to the reset terminal.

2. The DC-DC converter according to claim 1, wherein the delay circuit randomly changes the delay time.

3. The DC-DC converter according to claim 1, further comprising:
   a logic circuit, connected to the current detection circuit, the delay circuit, and the flip-flop circuit, for receiving the detection signal and the delayed pulse signal and providing the earlier one of the detection signal and the delayed pulse signal to the flip-flop circuit.

4. The DC-DC converter according to claim 1, wherein:
   the control unit includes a voltage detection circuit for detecting the output voltage of the DC-DC converter and generating a voltage detection signal; and the delay circuit includes a plurality of delay circuits, each randomly changing the delay time of the pulse signal within different predetermined delay time ranges, and selects a delayed pulse signal generated by one of the delay circuits in accordance with the voltage detection signal of the voltage detection circuit.

5. The DC-DC converter according to claim 4, wherein:
the voltage detection circuit compares the output voltage of the DC-DC converter with a reference voltage and generates a voltage detection signal that is in accordance with the result of the comparison; and
the delay circuit selects the delayed pulse signal generated by one of the delay circuits so as to decrease the ON duty of the output transistor and lower the output voltage when the output voltage is higher than the reference voltage in accordance with the voltage detection signal, and the delay circuit selects the delayed pulse signal generated by another one of the delay circuits to increase the ON duty of the output transistor and raise the output voltage when the output voltage is lower than the reference voltage.

6. A DC-DC converter comprising:
a converter unit including an output transistor, of which activation and inactivation of the output transistor are controlled in accordance with a control signal, for generating output voltage of the DC-DC converter; and
a control unit, connected to the converter unit, for generating the control signal that controls the activation and inactivation of the output transistor, in which the control signal has a duty, in which the control unit changes the duty of the control signal based on output current corresponding to the output voltage, the control unit including;
  a current detection circuit, connected to the converter unit, for detecting the output current and generating a detection signal;
  an oscillator for generating a pulse signal;
  a delay circuit, connected to the oscillator, for delaying the pulse signal and generating a delayed pulse signal, the delay circuit changing the delay time of the pulse signal; and
  a flip-flop circuit having a set terminal, for receiving the delayed pulse signal, and a reset terminal, for receiving the earlier one of the detection signal of the current detection circuit and the pulse signal of the oscillator, wherein the flip-flop circuit generates the control signal with the duty in accordance with the delayed pulse signal provided to the set terminal and the signal provided to the reset terminal.

7. The DC-DC converter according to claim 6, wherein the delay circuit includes:
a plurality of delay circuits for receiving the pulse signal and generating a plurality of delayed pulse signals having different delay times;
a random circuit for generating a random signal; and
a selection circuit, connected to the delay circuits and the random circuit, for selectively outputting the delayed pulse signals using the random signal.

8. The DC-DC converter according to claim 6, wherein:
the control unit includes a voltage detection circuit for detecting the output voltage of the DC-DC converter and generating a voltage detection signal; and
the delay circuit includes:
  a plurality of delay circuits for receiving the pulse signal and generating a plurality of delayed pulse signals having different delay times, each delay circuit generating a plurality of delayed internal pulse signals and selecting one of the delayed internal pulse signals as the delayed pulse signal in accordance with the voltage detection signal;
  a random circuit for generating a random signal; and
  a selection circuit, connected to the delay circuits and the random circuit, for selectively outputting the delayed pulse signals using the random signal.

9. The DC-DC converter according to claim 8, wherein:
the voltage detection circuit compares the output voltage of the DC-DC converter with the reference voltage and generates a voltage detection signal in accordance with the result of the comparison; and
each of the delay circuits selects one of the delayed internal pulse signals so as to decrease the ON duty of the output transistor and lower the output voltage when the output voltage is higher than the reference voltage according to the voltage detection signal, and each of the delay circuits selects another one of the delayed internal pulse signals so as to increase the ON duty of the output transistor and raise the output voltage when the output voltage is lower than the reference voltage.

10. The DC-DC converter according to claim 8, wherein each of the delay circuits includes:
a plurality of series-connected delay circuits for generating the delayed internal pulse signal at the respective output terminals; and
a selection circuit, connected to the delay circuits, for receiving the delayed internal pulse signals from the delay circuits and selecting one of the delayed internal pulse signals in accordance with the voltage detection signal.

11. A control circuit for generating a control signal for controlling activation and inactivation of an output transistor of a converter unit that generates output voltage of a DC-DC converter, in which the control signal has a duty, and the control circuit changes the duty of the control signal based on output current corresponding to the output voltage, the control circuit comprising:
a current detection circuit, connected to the converter unit, for detecting the output current and generating a detection signal;
an oscillator for generating a pulse signal;
a delay circuit, connected to the oscillator, for delaying the pulse signal and generating a delayed pulse signal, the delay circuit changing the delay time of the pulse signal; and
a flip-flop circuit having a set terminal, for receiving the pulse signal of the oscillator, and a reset terminal, for receiving the earlier one of the detection signal of the current detection circuit and the delayed pulse signal, wherein the flip-flop circuit generates the control signal with the duty in accordance with the pulse signal provided to the set terminal and the signal provided to the reset terminal.

12. The control circuit according to claim 11, wherein the delay circuit randomly changes the delay time.

13. The control circuit according to claim 11, further comprising:
a logic circuit, connected to the current detection circuit, the delay circuit, and the flip-flop circuit, for receiving the detection signal and the delayed pulse signal and providing the earlier one of the detection signal and the delayed pulse signal to the flip-flop circuit.

14. The control circuit according to claim 11, further comprising a voltage detection circuit for detecting the output voltage of the DC-DC converter and generating a voltage detection signal, wherein the delay circuit includes a plurality of delay circuits, each randomly changing the delay time of the pulse signal within different predetermined delay time ranges, and selects a delayed pulse signal generated by one of the delay circuits in accordance with the voltage detection signal of the voltage detection circuit.

15. The control circuit according to claim 14, wherein:
the voltage detection circuit compares the output voltage of the DC-DC converter with a reference voltage and generates a voltage detection signal that is in accordance with the result of the comparison; and
the delay circuit selects the delayed pulse signal generated by one of the delay circuits so as to decrease the ON duty of the output transistor and lower the output voltage when the output voltage is higher than the reference voltage in accordance with the voltage detection signal, and the delay circuit selects the delayed pulse signal generated by another one of the delay circuits to increase the ON duty of the output transistor and raise the output voltage when the output voltage is lower than the reference voltage.

16. A control circuit for generating a control signal for controlling activation and inactivation of an output transistor of a converter unit that generates output voltage of a DC-DC converter, in which the control signal has a duty, and the control circuit changes the duty of the control signal based on output current corresponding to the output voltage, the control circuit comprising:
a current detection circuit, connected to the converter unit, for detecting the output current and generating a detection signal;
an oscillator for generating a pulse signal;
a delay circuit, connected to the oscillator, for delaying the pulse signal and generating a delayed pulse signal, the delay circuit changing the delay time of the pulse signal; and
a flip-flop circuit having a set terminal, for receiving the delayed pulse signal, and a reset terminal, for receiving the earlier one of the detection signal of the current detection circuit and the pulse signal of the oscillator, wherein the flip-flop circuit generates the control signal with the duty in accordance with the delayed pulse signal provided to the set terminal and the signal provided to the reset terminal.

17. The control circuit according to claim 16, wherein the delay circuit includes:
a plurality of delay circuits for receiving the pulse signal and generating a plurality of delayed pulse signals having different delay times;

a random circuit for generating a random signal; and
a selection circuit, connected to the delay circuits and the random circuit, for selectively outputting the delayed pulse signals using the random signal.

18. The control circuit according to claim 16, further comprising a voltage detection circuit for detecting the output voltage of the DC-DC converter and generating a voltage detection signal, wherein the delay circuit includes:
a plurality of delay circuits for receiving the pulse signal and generating a plurality of delayed pulse signals having different delay times, each delay circuit generating a plurality of delayed internal pulse signals and selecting one of the delayed internal pulse signals as the delayed pulse signal in accordance with the voltage detection signal;
a random circuit for generating a random signal; and
a selection circuit, connected to the delay circuits and the random circuit, for selectively outputting the delayed pulse signals using the random signal.

19. The control circuit according to claim 18, wherein:
the voltage detection circuit compares the output voltage of the DC-DC converter with the reference voltage and generates a voltage detection signal in accordance with the result of the comparison; and
each of the delay circuits selects one of the delayed internal pulse signals so as to decrease the ON duty of the output transistor and lower the output voltage when the output voltage is higher than the reference voltage according to the voltage detection signal, and each of the delay circuits selects another one of the delayed internal pulse signals so as to increase the ON duty of the output transistor and raise the output voltage when the output voltage is lower than the reference voltage.

20. The control circuit according to claim 19, wherein each of the delay circuits includes:
a plurality of series-connected delay circuits for generating the delayed internal pulse signal at the respective output terminals; and
a selection circuit, connected to the delay circuits, for receiving the delayed internal pulse signals from the delay circuits and selecting one of the delayed internal pulse signals in accordance with the voltage detection signal.

* * * * *